Figure 1:
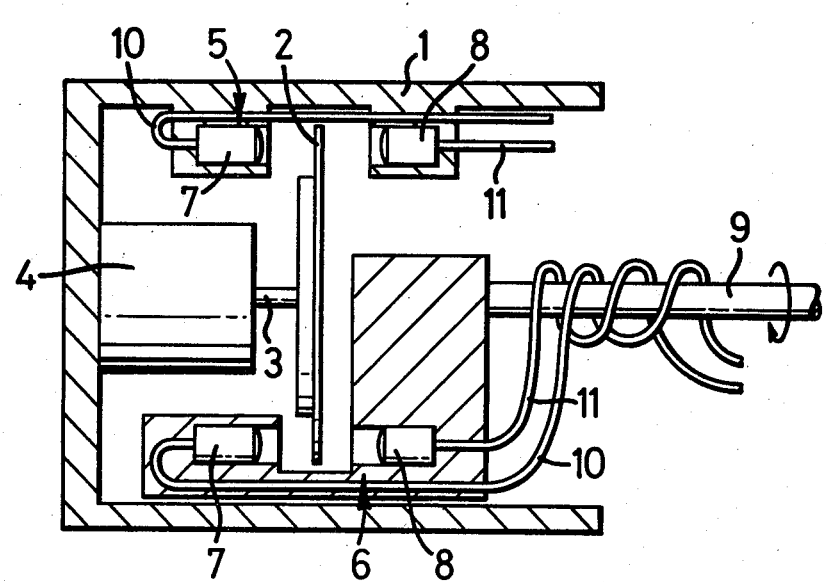

United States Patent [19]
Rush et al.

[11] 4,388,613
[45] Jun. 14, 1983

[54] OPTICAL DISPLACEMENT TRANSDUCERS

[75] Inventors: Derek A. Rush, London; Roger D. Swadling, Cheltenham, both of England

[73] Assignee: Smiths Industries Public Limited Company, London, England

[21] Appl. No.: 335,977

[22] Filed: Dec. 30, 1981

[30] Foreign Application Priority Data

Jan. 13, 1981 [GB] United Kingdom ............... 8100961

[51] Int. Cl.$^3$ ............................................. H03K 13/02
[52] U.S. Cl. .................................................. 340/347 P
[58] Field of Search ..................... 340/347 P, 870.79; 235/231 SE, 237 R

[56] References Cited

U.S. PATENT DOCUMENTS

| | | | |
|---|---|---|---|
| 3,098,152 | 7/1963 | Von Mathes | 340/347 P |
| 3,165,730 | 1/1965 | Robinson | 340/347 P |
| 3,461,307 | 8/1969 | Rusling | 340/347 P |
| 3,831,169 | 8/1974 | Raser | 340/347 P |

*Primary Examiner*—C. D. Miller
*Attorney, Agent, or Firm*—Pollock, Vande Sande & Priddy

[57] ABSTRACT

An optical displacement transducer for providing a digital output representative of the displacement of a variable from a datum value comprises a light beam emitter and a light beam receiver disposed on a common optical axis, a digital encoding element comprising an optical grating disposed between the light beam emitter and receiver, the grating extending in a circular path with the grating lines extending substantially radially of the path, means for causing relative rotation between the light beam and the grating about the center of the circular path whereby the light beam as seen by said receiver is in the form of a series of light pulses, a first reference position at a stationary position on the circular path, a second reference position on the circular path and angularly displaced about the center of the circular path from the first reference position whereby a predetermined light pulse count is produced during the relative rotation through the angle between the first and second reference positions, and control means for adjusting the second reference position relatively to the first reference position in response to displacement of the variable whereby to vary the pulse count in response to the displacement.

8 Claims, 3 Drawing Figures

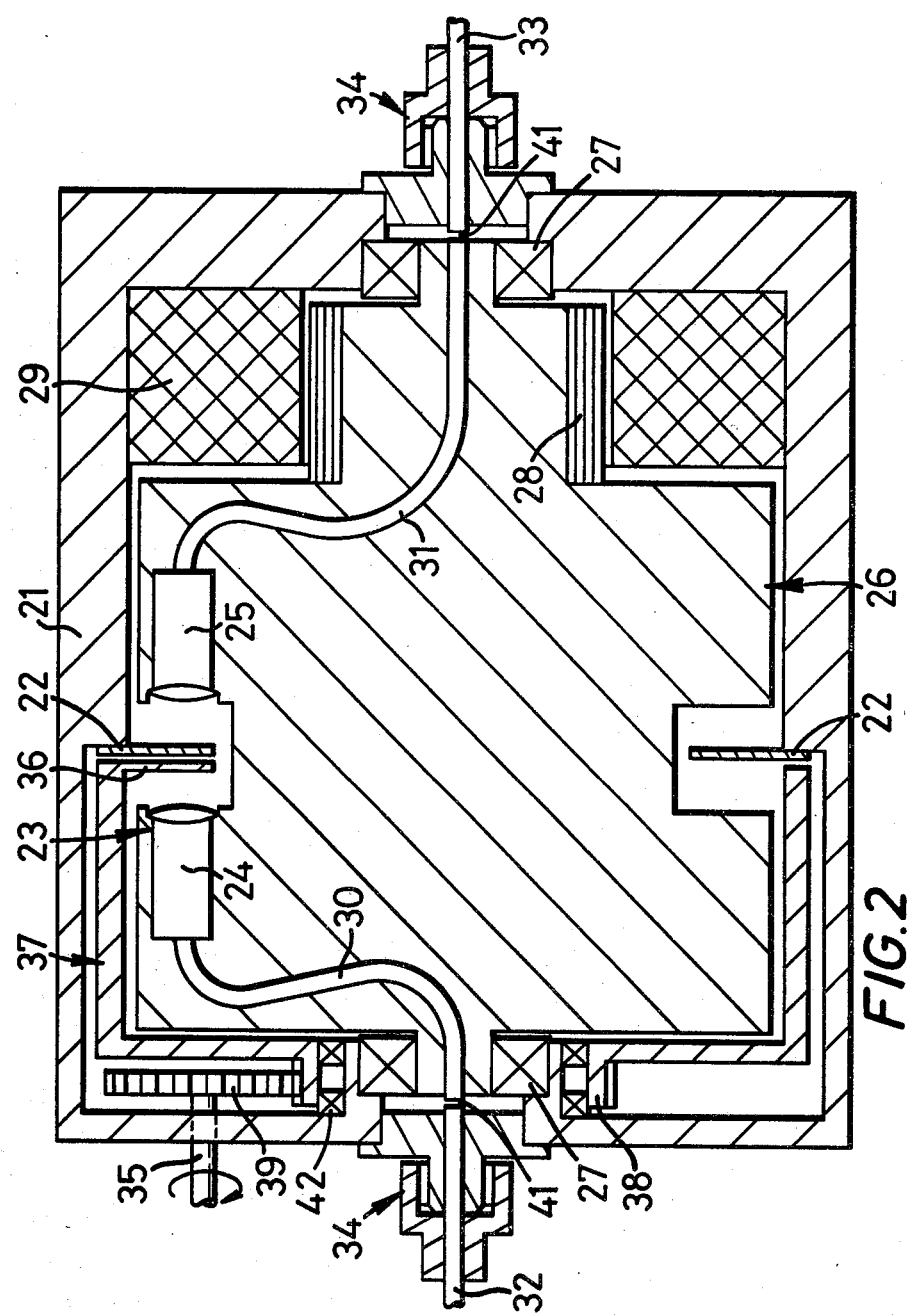

OPTICAL DISPLACEMENT TRANSDUCERS

This invention relates to displacement transducers for providing an output representative of the displacement of a variable from a datum value. In particular the invention relates to optical transducers providing a digital output.

Such displacement transducers have application as so-called displacement pick-offs for tracking the movement of a regulating actuator in various types of regulating system and providing a digital output representative of the instantaneous position of the regulator. However, they are not confined to this application and may be used in systems where the change in the value of the variable is not itself a positional displacement but can be represented as such to the transducer.

According to the invention an optical displacement transducer for providing a digital output representative of the displacement of a variable from a datum value comprises, (a) a light beam emitter and a light beam receiver disposed on a common optical axis, (b) a digital encoding element comprising an optical grating disposed between the light beam emitter and receiver, the grating extending in a circular path with the grating lines extending radially of said path, (c) means for causing relative rotation between said light beam and said grating about the centre of said circular path whereby the light beam as seen by said receiver is in the form of a series of light pulses, (d) a first reference position at a stationary position on said circular path.

(e) a second reference position on said circular path and angularly displaced about the centre of said circular path from said first reference position whereby a predetermined light pulse count is produced during said relative rotation through the angle between said first and second reference positions, and (f) control means for adjusting said second reference position relatively to said first reference position in response to displacement of said variable whereby to vary said pulse count in response to said displacement.

In one embodiment of the invention the encoding element is rotated about the centre of said circular path, said first reference position is defined by a first said light beam emitter and receiver and said second reference position is defined by a second said light beam emitter and receiver and said encoding element is encoded at a predetermined position on said grating so that a pulse count derived from one of said first and second light beam emitters and receivers is initiated when said predetermined position passes said first reference position and is terminated when said predetermined position passes said second reference position.

In another embodiment of the invention the digital encoding element is held stationary and the light beam emitter and receiver are rotated together about the centre of said circular path. In this embodiment the first reference position is encoded on said element and said second reference position is defined by a light-blocking mask which is disposed between said light beam emitter and receiver during a part of their rotational movement.

Figure 3:
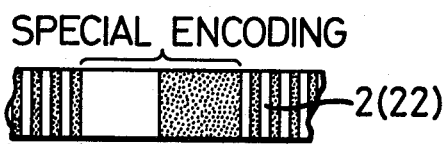

The invention will now be further described by way of example with reference to the accompanying drawings, in which:

FIG. 1 is a schematic diagram of a first optical displacement transducer in accordance with the invention, FIG. 2 is a schematic diagram of a second optical displacement transducer in accordance with the invention, and FIG. 3 is a scrap view of the grating of the transducers of FIGS. 1 and 2.

Referring to FIG. 1, the transducer has a cylindrical casing 1. A digital encoding disc 2 is mounted centrally on the shaft 3 of an electric motor 4 so that it is rotated by the motor 4 when the latter is energised, the motor 4 being mounted on an end wall of the casing 1. The disc 2 has an optical grating extending as a band completely around its periphery with the lines of the grating extending radially. The grating as shown in FIG. 3 comprises alternating light transmitting and light blocking lines so that when a light beam is shown through the grating from one side with the disc 2 rotating a series of light pulses will be seen from the other side of disc. Except for one reference position on the grating the lines of the grating are regularly spaced. Hence the light output is in binary code, a light pulse representing for example a binary '1' and no light pulse representing a binary '0'. At the one reference position of the grating a special encoding is provided by the lines of the grating as shown at the left of FIG. 3. Thus as the motor is continuously rotated the pulsed light output is both serial and absolute in nature, the special encoding providing a starting reference for each cycle.

A first optical unit 5 is mounted at a fixed position within the casing 1 so that it defines a first reference position on the circular path through which the grating moves when the disc is rotated. This optical unit comprises a light beam emitter 7 and light beam receiver 8 disposed on opposite sides of the grating. A second similar optical unit 6 comprising a light beam emitter 7 and light beam receiver 8 provides a second reference position on the circular path through which the grating moves. The second optical unit 6 is mounted on a rotatable shaft 9 which is co-axial with the motor shaft 3. Thus rotation of the shaft 9 will cause adjustment of the angular spacing of the optical unit 6 about the centre of the disc 2 from the optical unit 5. The shaft 9 constitutes the input shaft of the transducer and in use of the transducer is connected for example to a mechanical actuator, whose positional displacement is being tracked, so that its rotation is proportional to the displacement of the actuator.

The light beam emitter 7 and the light beam receiver 8 of both the optical units 5 and 6 comprise lens systems, disposed on a common optical axis. Instead of using lens systems the fibre ends can be extended to positions adjacent to the disc 2 to provide the emitter and receiver. Each light beam emitter 7 is connected by an optical fibre 10 to a light source for example a light emitting diode and each light beam receiver 8 is connected to a light beam detector forming an optical-to-electrical interface. The light source and detector can be remote from the transducer proper and further can be placed in an enclosure which provides shielding from electromagnetic fields. Such an arrangement will eliminate the possibility of corruption of the transducer output signal by intense fields. The interface is adapted to recognise the above referred to special encoding on the grating of the disc 2. The optical fibres 10 and 11 associated with the optical unit 6 are coiled about the shaft 9 to facilitate rotation of the optical unit 6 with the shaft 9.

In use of the displacement transducer, the disc 2 is continuously rotated by the motor 4 in one direction, and the optical units 5 and 6 continuously scan the grating. When the special encoding on the grating passes the optical unit 5 it is recognised by the associated detector and a "start of count" signal is given. The light pulses received by the receiver 8 of either the optical unit 5 or the optical unit 6 are counted until the special encoding on the grating passes the optical unit 6 and is recognised by the associated detector to provide an "end of count" signal. Thus for each revolution of the disc 2 a digital count of the angular spacing between the optical units 5 and 6 will be provided. As described above this angular spacing is varied by rotation of the shaft 9 in response to the displacement of the actuator to provide a varying digital count representative of the displacement of the actuator.

Referring now to FIG. 2, the displacement transducer shown is provided with a cylindrical casing 21. In contrast to the transducer shown in FIG. 1 an optical grating is provided on an annular member 22 which is non-rotatably mounted in the casing 21 and a single optical unit 23 comprising a light beam emitter 24 and a light beam receiver 25 is mounted so that it can be rotated around the circular path of the grating in order to scan the grating.

The grating on the annular member 22 is of the same form as the grating described with reference to FIG. 1, including the special encoding, which in this case provides a fixed "start of count" reference position. The optical unit 23 forms part of an assembly 26 which is mounted for rotation in bearings 27. The assembly 26 incorporates a permanent magnet rotor 28 of an electric motor whose windings are indicated at 29. Alternatively a drag cup motor could be used.

The light beam emitter 24 and the light beam receiver 25 comprise, as in the FIG. 1 transducer, lens systems, the emitter 24 and receiver 25, being connected by optical fibres 30 and 31 to a light source and a light detector respectively. The optical fibres 30 and 31 thus rotate with the assembly 26 and connect with stationary optical fibres 32 and 33 leading to the light source and detector through rotating joints 41 and connectors 34 disposed on the rotational axis of the assembly 26.

The transducer has an input shaft 35 which corresponds in function to the shaft 9 of FIG. 1. However in this case the shaft adjusts the position of a light blocking mask 36 around the circular path of the grating so that over a part of the path it prevents the light beam reaching the receiver 25. The mask 36 forms part of a member 37 surrounding the assembly 26 and having at one end a boss 38 which supports the member 37 for rotation on the bearing 42. The boss has a ring of gear teeth on its outer surface which mesh with a gear wheel 39 mounted on the input shaft 35, so that roation of the input shaft 35 causes a corresponding rotation of the mask 36.

In use of the displacement transducer of FIG. 2 the assembly 26 and hence the optical unit 23 is continuously rotated in one direction by the electric motor so that it scans the grating. When the optical unit 23 passes the special encoding on the grating a "start of count" signal is given. When the optical unit encounters the mask 36 an "end of count" signal is given. Between these two signals a count of the light pulses received by the detector via the receiver 25 is made. Hence the principle of operation of the transducer of FIG. 2 is the same as that of FIG. 1 in that a varying digital count is produced depending upon the angular spacing between two reference positions on the circular path of the grating, one of the reference positions being adjustable by the input shaft 35.

One advantage of the displacement transducers described is that a synchronous clock is not required by the remote conversation electronics to which the light detectors are connected since the transmitted signal contains a "start of count" and "end of count" code. Some variation in received pulse rate, due for example to variation in motor speed can therefore be accommodated. Also the angular momentum of the rotating assembly within the transducer enables rotation to continue during short duration motor supply interrupts. Since the transducer performance is tolerant of wide variations in the scanning speed, short inadvertent interrupts will not degrade its performance. The use of a motor driven scan provides the advantage that a simple means of converting a basic incremental encoder into an absolute encoder with a serial output. Further the use of optical signal paths, i.e. optical fibres, provides a signal that is virtually incorruptable by electromagnetic interference and is also tolerant of variations in light transmission.

Regarding the displacement transducer described with reference to FIG. 1 by measurement of the relative phase of the two pulse streams emanating from the two receivers in the processing electronics it is possible to:

(i) increase the resolution of the transducer beyond that provided by the encoder bit size, and (ii) provide an instantaneous update of input position as this position changes.

We claim:

1. An optical displacement transducer for providing a digital output representative of the displacement of a variable from a datum value comprising, (a) a light beam emitter and a light beam receiver disposed on a common optical axis, (b) a stationary digital encoding element comprising an optical grating disposed between the light beam emitter and and receiver, the grating extending in a circular path with the grating lines extending substantially radially of said path, (c) means for causing rotation of said light beam emitter and receiver together about the center of said circular path whereby the light beam as seen by said receiver is in the form of a series of light pulses, (d) a first reference position encoded on said digital encoding element, (e) a second reference position in the form of a light blocking mask adjacent and angularly displaced about the center of said circular path from said first reference position whereby a predetermined light pulse count is produced during said rotation of the light beam emitter and receiver through the angle between said first and second reference positions, and (f) control means for adjusting said second reference position relatively to said first reference position in response to displacement of said variable whereby to vary said pulse count in response to said displacement 2. An optical displacement transducer according to claim 1, wherein said first reference position is defined by a variation in character of at least one said grating line as compared with the rest of said grating lines.

3. An optical displacement transducer according to claim 2, wherein said variation in character comprises an increase in width of at least one grating line and an increase in the spacing of said one grating line from an adjacent grating line.

4. An optical displacement transducer according to claim 1, wherein the, or each, said light beam emitter and light beam receiver is connected to a light source and a light detector via optical fibres.

5. An optical displacement transducer according to claim 4, wherein the ends of said optical fibres remote from the light source and detector constitute said light beam emitter and light beam receiver respectively.

6. An optical displacement transducer according to claim 4, wherein lens systems connected to the ends of said optical fibres remote from the light source and detector constitute said light beam emitter and light beam receiver respectively.

7. An optical displacement transducer according to claim 2, wherein the, or each, said light beam emitter and light beam receiver is connected to a light source and a light detector via optical fibres.

8. An optical displacement transducer according to claim 3, wherein the, or each, said light beam emitter and light beam receiver is connected to a light source and a light detector via optical fibres.

* * * * *